United States Patent
Qiu et al.

(10) Patent No.: US 11,093,647 B2
(45) Date of Patent: Aug. 17, 2021

(54) METHOD AND DEVICE FOR EXECUTING SYSTEM SCHEDULING

(71) Applicant: BANMA ZHIXING NETWORK (HONGKONG) CO., LIMITED, Kowloon (HK)

(72) Inventors: Shaoxiang Qiu, Hangzhou (CN); Laiguang Xu, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 257 days.

(21) Appl. No.: 16/132,039

(22) Filed: Sep. 14, 2018

(65) Prior Publication Data

US 2019/0180055 A1    Jun. 13, 2019

Related U.S. Application Data

(63) Continuation-in-part of application No. PCT/CN2017/075853, filed on Mar. 7, 2017.

(30) Foreign Application Priority Data

Mar. 18, 2016   (CN) .......................... 201610159286.7

(51) Int. Cl.
*G06F 21/62* (2013.01)
*G06F 21/52* (2013.01)
(Continued)

(52) U.S. Cl.
CPC .......... *G06F 21/6281* (2013.01); *G06F 9/545* (2013.01); *G06F 21/52* (2013.01);
(Continued)

(58) Field of Classification Search
CPC ....... G06F 21/53; G06F 9/545; G06F 21/6281
See application file for complete search history.

(56) References Cited

U.S. PATENT DOCUMENTS

| 6,260,057 B1 | 7/2001 | Eykholt |
| 6,735,666 B1 | 5/2004 | Koning |

(Continued)

FOREIGN PATENT DOCUMENTS

| CN | 101493873 A | 7/2009 |
| CN | 101739361 A | 6/2010 |

(Continued)

OTHER PUBLICATIONS

Wang, Tao. "Runtime Loadable Modulized Secure Linux Kernel" Chinese Doctoral Dissertations & Master's Theses Full-Text Database. Information Science and Technology. Jan. 2004.

*Primary Examiner* — Lynn D Feild
*Assistant Examiner* — Viral S Lakhia
(74) *Attorney, Agent, or Firm* — Van Pelt, Yi & James LLP

(57) ABSTRACT

The present application discloses a method, system, and device for executing system calls. The method includes obtaining, by one or more processors, a request to execute a system call, the request to execute the system call being made by an executor to execute the system call, determining, by the one or more processors, whether the executor to execute the system call has an access permission for the system call, and in response to determining that the executor has the access permission for the system call, permitting, by the one or more processors, the executor to execute the system call.

23 Claims, 5 Drawing Sheets

(51) Int. Cl.
*G06F 9/54* (2006.01)
*G06F 21/53* (2013.01)

(52) U.S. Cl.
CPC ............ *G06F 21/53* (2013.01); *G06F 21/629* (2013.01); *G06F 2221/2141* (2013.01)

(56) References Cited

U.S. PATENT DOCUMENTS

| | | | |
|---|---|---|---|
| 7,360,213 | B1 | 4/2008 | Alfieri |
| 8,656,465 | B1* | 2/2014 | Fong-Jones ......... G06F 21/6281 726/5 |
| 9,680,772 | B2* | 6/2017 | Kothari ............... H04L 41/0859 |
| 9,680,876 | B2* | 6/2017 | Porras ..................... H04L 63/10 |
| 2003/0005168 | A1 | 1/2003 | Leerssen |
| 2004/0133802 | A1 | 7/2004 | Liu |
| 2008/0046725 | A1 | 2/2008 | Lo |
| 2008/0250400 | A1* | 10/2008 | Vertes ................... G06F 9/4486 717/158 |
| 2009/0089463 | A1 | 4/2009 | Iga |
| 2011/0138146 | A1 | 6/2011 | Molnar |
| 2011/0213971 | A1* | 9/2011 | Gurel ................... H04L 9/3271 713/165 |
| 2011/0238984 | A1* | 9/2011 | Roush ..................... G06F 21/53 713/166 |
| 2011/0271279 | A1* | 11/2011 | Pate ..................... H04L 63/083 718/1 |
| 2012/0011153 | A1* | 1/2012 | Buchanan ............ G06F 21/552 707/771 |
| 2014/0082327 | A1* | 3/2014 | Ghose ..................... G06F 11/00 712/205 |
| 2015/0020075 | A1* | 1/2015 | Glew ...................... G06F 9/468 718/101 |
| 2015/0128262 | A1* | 5/2015 | Glew .................... G06F 21/577 726/23 |
| 2015/0186659 | A1* | 7/2015 | Leslie-Hurd .......... G06F 12/145 726/1 |
| 2015/0199532 | A1* | 7/2015 | Ismael .................. G06F 21/552 726/30 |
| 2016/0048688 | A1* | 2/2016 | Flynn .................... G06F 21/629 713/193 |
| 2016/0063258 | A1* | 3/2016 | Ackerly ............. H04L 63/0428 713/189 |
| 2016/0117229 | A1* | 4/2016 | Epstein ................ G06F 12/145 714/6.23 |
| 2017/0124320 | A1* | 5/2017 | Fojtik ................... G06F 21/629 |
| 2018/0232266 | A1* | 8/2018 | Ikeda ...................... G06F 9/546 |

FOREIGN PATENT DOCUMENTS

| | | |
|---|---|---|
| CN | 102930205 | 2/2013 |
| CN | 104112089 A | 10/2014 |
| CN | 104252380 | 12/2014 |
| WO | 2012030551 A1 | 3/2012 |

* cited by examiner

US 11,093,647 B2

METHOD AND DEVICE FOR EXECUTING SYSTEM SCHEDULING

CROSS REFERENCE TO OTHER APPLICATIONS

This application is a continuation-in-part of and claims priority to International (PCT) Application No. PCT/CN2017/075853 entitled METHOD AND DEVICE FOR EXECUTING SYSTEM SCHEDULING, filed Mar. 7, 2017 which is incorporated herein by reference for all purposes, which claims priority to China Application No. 201610159286.7 entitled METHOD AND MEANS FOR EXECUTING SYSTEM CALLS, filed Mar. 18, 2016 which is incorporated herein by reference for all purposes.

FIELD OF THE INVENTION

The present application relates to system call technology. In particulate, the present application relates to a method, device, and system for executing system calls.

BACKGROUND OF THE INVENTION

To ensure security, space in an operating system (e.g., Linux, etc.) is generally divided between a kernel space and a user space. The kernel space and the user space operate separately on different levels and are logically isolated from each other. Application programs are generally not permitted to access kernel data. In addition, application programs are generally not permitted to use kernel functions. Application programs can generally only manipulate user data within the user space or call user space functions. When an application (e.g., a user program) is to obtain a system service or to access a system kernel function, a system call (syscall) is to be executed.

When a system call is executed, the system call generally enters the kernel space through an interrupt mechanism in the software (e.g., a user mode application that is run in the user space).The operating system comprises user-mode applications and kernels. In other words, the system call generally enters the kernel space and only after the system call enters the kernel space can the system call execute the corresponding system service routine. On a logical level, a system call may be viewed as an interface for interactions between the kernel and the user space. For example, the system call transmits a user space request to the kernel space, waits for the kernel space to complete processing of the user space request, and sends the processing result back to user space via the kernel space. For example, the kernel space can send the processing result to the user space.

Specific operating systems generally provide large numbers of system calls. The system calls provided by an operating system are exposed in the user space (e.g., the user space can make function calls that are system calls). A system call that is exposed in the user space can be invoked from the user space. Many system calls are never called during the life cycles of most applications (e.g., programs). Furthermore, system calls exposed in the user space tend to have various security flaws, which can be exploited by malicious actors. For example, malicious use of the security flaws of system calls exposed in the user space can imperil the security of the entire system. Therefore, a need exists for restricting the execution of system calls by applications. For example, the Linux operating system supports a concise secure computing mode (seccomp) sandboxing mechanism to provide a secure operating mode. Program processes that operate in the secure computing mode (e.g., the sandbox) can generally only invoke four system calls, namely read, write, exit, and sigreturns. Otherwise, the program will be terminated.

Although the seccomp sandboxing mechanism restricts some system calls, the seccomp sandboxing mechanism cannot achieve differentiated restrictions because the seccomp sandboxing mechanism regards all restricted processes as the same. Moreover, the seccomp sandboxing mechanism lacks extendibility because the seccomp sandboxing mechanism only makes available four system calls (read, write, exit, sigreturn). Accordingly, the seccomp sandboxing mechanism is unable to meet reasonable system call access requirements of user space.

In view of the above, there is a need for a method, device, and system for executing system calls.

BRIEF DESCRIPTION OF THE DRAWINGS

Various embodiments of the invention are disclosed in the following detailed description and the accompanying drawings.

DETAILED DESCRIPTION

Figure 1:
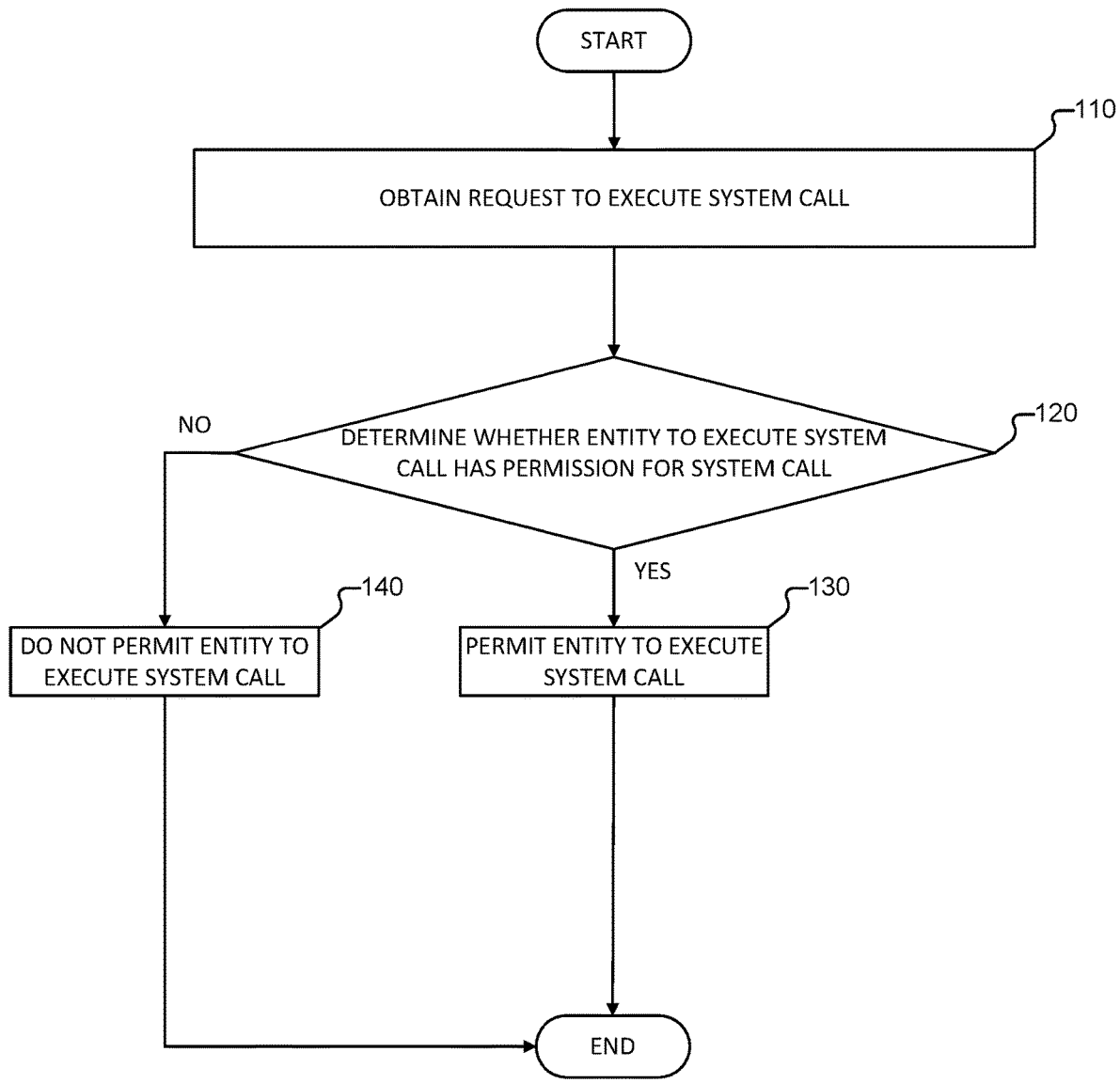
FIG. 1 is a flowchart of a method for executing a system call according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The descriptions below set forth many particular details for a full understanding of the present application. However, the present application may be implemented in many ways other than those described herein. A person skilled in the art may similarly extend the present application without violating its content. Therefore, the present application is not restricted by the specific implementations disclosed below.

As used herein, a terminal generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HIVID), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

In some embodiments, a terminal has multimedia functions. A terminal can support audio, video, data, and other such functions. The terminal can have a touchscreen. The terminal can correspond to a smart mobile device such as a smart phone, a tablet computer, or a smart wearable device, or a smart television, personal computer, or other such device with a touchscreen. Various operating systems such as Linux, Android, iOS, YunOS, tvOS, and Windows, can be implemented on the smart terminal. A terminal can be connected to one or more networks such as the Internet, a WiFi network, a Local Area Network (LAN), a Wide Area Network (WAN), a telecommunications network, etc.

A terminal can be connected to one or more peripherals (e.g., smart peripherals). For example, the terminal can be connected to one or more peripherals via a Bluetooth connection, a WiFi direct connection, an infrared connection, a ZigBee connection, a Bluetooth Low Energy (BLE) connection, a WiMax connection, a Low Power Radio (LPR) connection, a Near Field Communications (NFC) connection, etc.

Various embodiments provide a method, device, and system for executing system calls. The various embodiments are explained in further detail below.

In some embodiments, a method for executing system calls comprises providing a sandboxing mechanism for imposing permission controls on execution of system calls. According to various embodiments, execution of system calls is restricted based at least in part on permissions for an entity that is attempting to execute a system call. For example, the execution of system calls is restricted based at least in part on a permission of the entity with respect to the system call that the entity is attempting to execute. According to various embodiments, the method for executing system calls comprises determining whether a system call relating to an obtained system call request can be executed. Determining whether the system call can be executed can comprise determining whether an entity to process the system call (also referred to herein as the executor or executing entity, for example, a thread such as a user space thread) holds the corresponding access permission. The entity can be a thread running on the operating system. In some embodiments, an application comprises at least one process (e.g., a method), and the process comprises at least one thread. Further, in some embodiments, the thread calls at least one function. According to various embodiments, only an authorized entity (e.g., an executor) can execute a system call. Thus, various embodiments restrict execution of system calls and can implement entity status-based differentiated control. In some embodiments restrictions are not imposed on system calls that are unrestricted (e.g., that the operating system of the terminal deems as unrestricted). For example, in the case of Linux, the system calls for read, write, exit, and sigreturns in the context of (e.g., from within) the seccomp sandboxing mechanism are unrestricted and various embodiments impose no restrictions on such system calls. Therefore, various embodiments can flexibly meet the reasonable system call access requirements of the user space.

According to various embodiments, functions of a program (e.g., an application) are implemented by processes. For example, in a system that supports multiple threads, program functions can be concurrently implemented by multiple threads. While the program functions are running, processes or threads can, as necessary, execute system calls (which can also be referred to as syscalls). For example, in connection with the running of the program functions, a process or thread may determine that a system call is to be executed and in response to determining that the system call is to be executed, the process or thread can invoke the system call. The entity to process the system call (e.g., the executor) is generally referred to as a basic unit capable of running independently. According to various embodiments, for a function, a piece of instruction is not run independently; rather, the piece of instruction runs on a thread or process. For example, the entity to process the system call is an independent instruction stream, the execution or running of which is scheduled by the operating system. In some embodiments, the entity to process the system call is a process or a thread. For example, the entity to process the system call is a process or a thread that runs on the operating system and is invoked in response to the operating system receiving an instruction to execute a system call (e.g., from an application running on the operating system). The example of an implementation of various embodiments is described in connection with a Linux system. However, other systems running various other operating systems can be implemented. Because processes and threads are unified in Linux, threads and processes will not be differentiated for purposes of discussing the various embodiments. However, in embodiments, in systems in which threads and processes are not unified, the entity to process the system call can be a process or a thread. Generally, a thread is regarded as a lightweight process of shared dataspace. Therefore, the descriptions of the embodiments below make no clear distinction and will generally make use of thread-related expressions.

Various embodiments are implements at a united portal of the kernel. For example, the process for executing system calls can be implemented at a unified portal for the kernel.

Implementation at a unified portal for the kernel can comprise implementation by a service provider (e.g., an independent service provider) in the kernel. As an example, according to some embodiments, an executor performs a system call, and thus the process according to conventional art comprises an executor and a system call. According to various embodiments, a process for processing a service call comprises an executor, a system call, and an independent service provider in the kernel. A request to execute a system call issued from (e.g., within) user space can be provided (e.g., submitted) to the service provider in the kernel (e.g., that implements the process for executing system call). The service provider can determine whether the entity to process the system call is permitted to execute the corresponding system call. For example, in response to the service provider receiving the system call from the user space (e.g., from an application or process running in the user space of the terminal or operating system thereof), or in response to receiving an indication that a system call from the user space is received, the service provider determines whether the entity to execute the system call or the application invoking (or requesting) the system call is permitted to execute the corresponding system call. The determination of whether the entity to execute the system call is permitted to do so can comprise querying a mapping of permissions with respect to system calls. For example, the mapping can comprise a mapping of system calls and entities permitted to execute (or call) the respective system calls. The mapping can comprise system calls to types of entities, identifiers of entities, contexts, etc. If the entity to execute the system call is determined to be permitted to do so, then the system call request can be distributed to a corresponding system call service routine. In some embodiments, the corresponding system call service routine is invoked (e.g., triggered) directly to implement the system call function corresponding to the requested system call (e.g., the system call associated with the system call request). According to various embodiments, a system call has a corresponding system call service routine. As an example, each system call has a corresponding system call service routine. The terminal can store a mapping of system calls to corresponding system call service routines, and the mapping of system calls to corresponding system call service routines can be queries in connection with determining the system call service routine to perform.

In some embodiments, the process for executing system calls comprises obtaining (e.g., receiving) a request to execute a system call, determining whether the entity to process the system call (e.g., the executor of said system call) has access permission for the corresponding system call, and in response to determining that the executor has the requisite permissions (e.g., access permission for the corresponding system call), permitting the executor to execute the system call.

According to various embodiments, access permission of the executor is set in advance of system calls. Permissions for system calls (e.g., to execute system call) can be set on a system call-by-system call basis or an executor-by-executor basis (e.g., an application-by-application basis). In some embodiments, the permissions of the executor with respect to one or more system calls are set in response to the executor being installed on the terminal. The setting of the access permission in advance of the system call can generally refer to granting an authorization in advance of the system call being executed (or requested). The granting of authorization in advance of the system call being executed can comprise defining the system calls for which the executor holds access permission and adding the names or index numbers corresponding to such system calls to an authorization set of the entity (e.g., the executor). Thus, in response to receiving a system call request from the executor, based at least in part on preset access permission with respect to the executor or the system call associated with the system call request, a determination is made as to whether the executor has access permission for the system call. For example, the terminal determines whether an authorization set of the executor includes the name or index number (or other identifier) of the requested system call. In response to determining that the authorization set of the executor comprises an indication of an access permission for the requested system call (e.g., determining that the authorization set includes the name, index number, or other identifier of the requested system call), the executor is deemed to have access permission for the system call and is permitted to execute the system call.

Because terminals can generally support a large number of system calls and a majority of system calls can be grouped according to functions or other features, the system calls can be classified in advance to facilitate authorization management. In some embodiments, system calls are grouped into a preset number of categories. The categories in which the system calls are grouped can serve as the basic units for setting executor permission. The grouping of system calls into categories can reduce the work load of the authorization process and increase the execution efficiency of performing system calls. According to various embodiments, the categories in which the system calls are grouped correspond to types of system calls, a permission set of system calls (e.g., the types or defined sets of executors that are to have permission to call the corresponding system calls), information subject to the corresponding system calls, etc. As an example, a system call corresponding to open, openat, and creat can each respectively open a file and return a file descriptor, and thus open, openat, and creat can correspond to a same category.

FIG. 1 is a flowchart of a method for executing a system call according to various embodiments of the present application.

Referring to FIG. 1, process 100 for executing a system call is provided. Process 100 can be implemented in connection with process 200 of FIG. 2, process 300 of FIG. 3, and/or process 400 of FIG. 4. Process 100 can be implemented at least in part by computer system 500 of FIG. 5.

According to various embodiments, a category designation is set for a system call based at least in part on pre-allocated system call categories. For example, the system call can be associated with (e.g., mapped to) one or more categories (e.g., predefined categories). In some embodiments, access permissions associated with an executor are set for each category with which the system call is associated. Each of the one or more categories can have (defined) corresponding access permissions. In some embodiments, the access permissions associated with a system call are set for each system call (e.g., irrespective of a category to which the system call belongs). Performing process 100 can be based at least in part on the category designation set for a system call and/or the pre-allocated system call categories used in connection with allocating system calls. For example, determining whether to process a system call can be based on the set of permissions of a category for a system call. System call categorization is discussed in further detail below.

(1) Use pre-allocated system call categories as a basis to designate the category to which said system call belongs.

The system calls provided by the kernel can be pre-allocated to a preset number of categories. The pre-allocation of the system calls to categories can be configured by an administrator, a manufacturer, an operating system developer, etc. In some embodiments, the system calls provided by the kernel are classified according to different standards. For example, the system calls are allocated according to implemented functions to a network operations-related category, a file operations-related category, a permission settings-related category, etc. The preset number of categories into which the system calls are pre-allocated (e.g., grouped) can be configurable (e.g., based on preferences or requirements). In some embodiments, the preset number N can be 32 for a 32-bit system, 64 for a 64-bit system, etc. If a system call classification is less than 32 for a 32-bit system, or 64 for a 64-bit system, unused bits can remain empty or null. The categories into which the system calls are grouped can be associated with an identifier (e.g., a unique identifier). The allocated categories can be numbered 1 through N. For example, the network operations-related category can be labeled 1, and the file operations-related category can be labeled 2.

After the categories are allocated (e.g., defined), a system call can be allocated to the category to which the system call belongs. In some embodiments, each system call is allocated to a category. In some embodiments, only system calls exposed to the user space are allocated to a category. For example, a system call that is exposed to the user space is allocated to one or more categories. Accordingly, the system call corresponding to a system call request is associated with a category. According to various embodiments, each system call belongs to only one category. For example, the system call "read ( )" is designated as belonging to category 2 (e.g., belonging to the file operations-related category). In some embodiments, each system call generally has a corresponding index number or other identifier (e.g., a unique identifier among system calls). The terminal can store the name, index number, or identifier of the system call in correspondence with the identifier of the category to which the system belongs. For example, a mapping of system calls to categories (of system calls) can be stored. The mapping can be configured to store a mapping of identifiers associated with system calls to identifiers associated with categories. A category can have one or more system calls associated therewith.

Various embodiments can be implemented to execute permission checks (e.g., of entities requesting to execute the system call) more efficiently. For example, in some embodiments, a binary bit string is used to identify the one or more categories to which the one or more system calls belong. The length of binary bit string used to identify the categories to which the system calls belong can correspond to (e.g., be the same as) the number of system call categories N. Each bit individually corresponds to a system call category. For example, an identifier of a category can correspond to a bit (or a bit identifier of the bit such as the bit number). As an example, bit 1 corresponds to category 1, bit 2 corresponds to category 2, . . . , and bit N corresponds to category N. The value of the bit can identify whether the system call belongs to the category corresponding to the bit. For example, the value of each bit represents the relationship of the system call to the corresponding category: 1 indicates that the system call belongs to the corresponding category, and 0 indicates that the system call does not belong to the corresponding category. For example, if the 32-bit binary bit string that describes the category to which a certain system call belongs is 0100000 . . . 0, the bit string indicates that the system belongs to category 2. As another example, if an 8-bit binary bit string that describes the categories to which a certain system call belongs is 00100000, the bit string indicates that the system call belongs to category 3 (or the category associated with the third bit). As another example, if an 8 bit binary bit string that describes the categories to which a certain system call belongs is 10100000, the bit string indicates that the system call belongs to categories 1 and 3 (or the categories respectively associated with the first bit and the third bit). Accordingly, the terminal (e.g., a process running on the operating system such as in the kernel space) can determine whether an entity requesting to execute a system call has permission to execute the system call based at least in part on the binary bit string associated with the system call.

According to various embodiments, a binary bit string is used to identify each system call accessible from user space. In some embodiments, the binary bit string is used to identify each system call exposed to a seccomp sandboxing mechanism. If a total of S system calls (e.g., accessible from a user space) exist, then each of the S system calls can have a corresponding identifier or can be associated with a corresponding bit in a binary bit string. For example, an index number value range being 0 through S−1 can be used to characterize the total of S system calls. The binary bit string characterizing the system calls (e.g., the system calls exposed to the user space) corresponds to an S binary bit string. In some embodiments, the S binary bit string describing the classifications to which the corresponding system calls belong is stored and managed using a two-dimensional bit array, denoted by category[N][S] (e.g., a first dimension being defined by a number of categories N, and a second dimension being defined by a number of corresponding system calls). The length stored by category[0][m] through category[N−1][m] is N binary bit strings. Category[0][m] to category[N−1][m] can represent the category of the system call with index number m. For example, if the system call with index number m belongs to the second category and if 20 categories exist, then category [0][m] to category [19][m] is represented by 01000000000000000000, where category [0][m] is 0, category [1][m] is 1, category[2][m] is 0, etc.

According to various embodiments, category[N][S] is preset. For example, matrix category [N][S] is preconfigured based at least in part on a grouping of system calls (e.g., S system calls, S being a positive integer) into categories (e.g., N categories, N being a positive integer). According to various embodiments, configuration information pertaining to the categories and/or system calls is stored in a system configuration file. For example, bit strings corresponding to the categories and/or system calls, or matrix category [N][S] can be stored in a system configuration information file. According to various embodiments, the permissions associated with system calls or permissions extended to entities requesting to execute system calls can be dynamically adjusted. For example, such permissions can be adjusted or initialized based at least in part by re-assigning (re-allocating) a system call to another category (e.g., with a desired permission set). The appropriate initialization of permissions corresponding to a system call can be made at system startup through reading the configuration information in the configuration file. For example, the form of the configuration information may be "syscall.classify type name," wherein "syscall.classify" is the keyword, "name" is the syscall name, and type represents the identifier (1 through N) of the category to which a system call belongs. At system startup, the retrieved configuration information is converted into corresponding binary bit strings, and the corresponding bit values in category[N][S] are updated. Accordingly, various embodiments enable flexible adjustment of system call categories (or permission) based on rules of strategy. In some embodiments, a mapping of system calls to categories is stored. In some embodiments, a mapping of system calls to one or more properties for determining a corresponding category (e.g., one or more rules) is stored. The mapping system calls to categories and/or mappings of system calls to one or more properties for determining a corresponding category (e.g., one or more rules) are queried to set permissions of a system call.

(2) The access permission of an executor is set for each category of system call.

Various embodiments provide a preferred classification-based implementation. According to the preferred classification-based implementation, authorizations for an executor are defined in the kernel according to category. Permission levels associated with an executor with respect to one or more system calls can be set based on a life cycle of the executor and/or a state of a life cycle of the executor. In at least one stage of the life cycle of the executor, the access permission of the executor for one or more categories of system calls is set. As an example, permissions for an executor are set during a life cycle of the executor. As another example, a permission of an executor is first set to inherit permissions corresponding to a parent executor (e.g., parent thread), and then the permission of the executor can be further defined according to the call of the function. In some embodiments, the executor calls a function (e.g., actively calls the function) that sets the permission. The function can modify the set of permissions that the executor inherited from a parent executor corresponding to the executor. The access permission of the executor can be set for each category of system call during the life cycle of the executor. The life cycle of an executor includes a creation stage, a stage between creation and running (e.g., a configuring stage), a running stage, etc. In some embodiments, the access permission of an executor for one or more categories of system calls (or each category of system calls) is set in (e.g., during) one or more stages. For example, the access permission of an executor for one or more categories of system calls (or each category of system calls) is set in different stages. Various embodiments implement dynamic management of the access permission (or other permissions) for an executor and/or provide system call execution security safeguards that are more flexible than conventional art.

In some embodiments, the entity to process (or request) the system call (e.g., the executor) is a thread. The access permission of a thread can be set for one or more categories of system calls (e.g., for each category of system call). The permission setting process prior to running a thread can include a process of step-by-step lowering of the permission to bring the system call access permission of the thread within a secure range. The secure range can be set (e.g., defined) by a developer of the application, operating system, etc. The secure range can be set according to executor (e.g., thread) requirements and a system call classification. In some embodiments, the process of step-by-step lowering of the permission is configured such that after the security scope is restricted, the thread runs normally, and the executor can only (e.g., with respect to system calls) execute the system call required by the executor. When the thread is running, the access permission can be automatically raised, lowered, or resumed depending on a trust level of the running code. In some embodiments, the trust level is set (e.g., defined) by a developer of the application, operating system, etc. In some embodiments, the trust level is set (e.g., defined) by an administrator of the terminal, etc. In some embodiments, one or more permissions can be set according to trust levels by the developer of the application, operating system, or an administrator of the terminal, etc. For example, the terminal can store a mapping of trust levels to permissions (e.g., access permissions) or a mapping of trust levels to permission levels. In response to determining a trust level of the thread (or code being executed), the terminal can set the permissions for the thread (e.g., with respect to requesting/executing a system call) based at least in part on the mapping of trust levels to permissions. The mapping of trust levels to permissions can be configurable based on preferences, etc.

Various embodiments can prevent a thread from configuring its own permissions (e.g., with respect to requesting/executing a system call). In some embodiments, a thread is prevented from increasing a level of permissions (e.g., increasing a set of permissions) with respect to actions that the thread can process or request or with respect to certain actions that the thread can take in relation to specific data (e.g., data stored in a secure zone, etc.). Increasing a level of permissions can include changing a set of permissions associated with the thread such that the thread is permitted to process or request processes, functions, and/or data that is deemed less restrictive than before such change. For example, a write function with respect to data is deemed less restrictive than a read function with respect to such data. Accordingly, if a thread previously has permission to read such data and the thread modifies the set of permissions of the thread with respect to the data such that the thread has write functionality with respect to such data, the level of permissions of the thread has increased.

In some embodiments, the thread is prevented from excessively raising permissions for the thread (e.g., from raising the permissions for the thread beyond a threshold of permissions or a threshold of a relative change in permissions). Various embodiments can implement access capability and impose restrictions on adjustments to access permission by the thread in connection with preventing a thread from excessively raising its own permission. Access capability and/or imposition of restrictions on adjustments to one or more permissions can be implemented by setting access capability of the thread with respect to the access permissions before the thread runs. The access capability of a thread indicates a range of capabilities that the thread has for accessing one or more system calls. The access capability of a thread can be configured on a system call-by-system call basis, on a category of system call-by-category of system call basis, etc.

In some embodiments, the access permission of the thread for each category of system call (also referred to herein as "access permission") and access capability for each category of system call (also referred to herein as "access capability") are expressed (e.g., defined) by using separate sets. The access permission set comprises category identifiers for which the thread has access permission. The range of values of the access permission is 1 through N. The access capability set comprises category identifiers for which the thread has access capability. The range of values of the access capability set is 1 through N. For a thread, the access permission set is a subset of the access capability set. An upper limit of the range of values can correspond to a number of categories (e.g., a number of categories into which the system calls are grouped).

According to various embodiments, an access capability is a superset of permissions, and access permissions correspond to permissions currently set (e.g., for a category). As an example, the access capability defines a threshold of permissions to which a category can be promoted.

As an example, if an executor has access permissions represented by 001100, and an access capability represented by 011100, then the executor has the permissions corresponding to the third and fourth categories of system call, and the executor can be promoted to gain access to the second category of system call.

For example, a thread has access capability for system call categories having category identifiers 1, 2, and 3. The access capability set for such thread is therefore {1, 2, 3}. The access permission set for such a thread is a subset of {1, 2, 3}. For example, the access permission set can be one of the following sets: {1, 2, 3}, {1, 2}, {1, 3}, {2, 3}, {1}, {2}, {3}. In some embodiments, the access permission set is predefined. For example, the access permission set is by a developer of the application, operating system, or an administrator of the terminal, etc.

According to various embodiments, one or more of the thread access permission (e.g., the access permission set) and access capability (e.g., the access capability set) are expressed (e.g., defined) using binary bit strings. The binary bit strings used to express the access permissions and the access capability can be similar to the one or more binary bit strings used to express the categories to which system calls belong. For example, the length of the one or more binary bit strings used to express the access permission and/or the access capability is the same as the number of system call categories. The bits in the one or more bit strings used to express the access permission and/or the access capability can individually correspond to a system call category. For example, each bit in the bit string can respectively correspond to a system call category having the same serial number. For example, a first bit in the bit string can correspond to the category with identifier category 1, the second bit in the bit string can correspond to the category with identifier category 2, . . . , and the N-th bit in the bit string can correspond to the category with identifier category N. The value of a bit in the bit string indicates whether the thread holds access permission for the corresponding category of system call. In some embodiments, 1 indicates that the thread has access permission for the corresponding category of system call, and 0 indicates that the thread does not have permission for the corresponding category of system call. In some embodiments, the thread has access permissions to a single category of system calls. In some embodiments, the thread has access permissions to a plurality of categories of system calls and the bit string can comprise multiple bits identifying the access permissions with respect to the plurality of categories of system calls. For the sake of descriptive convenience, various embodiments described herein are described with an abbreviation of the binary bit string which describes thread access permission for each category of system call as the "access permission bit string," and/or an abbreviation of the binary bit string which describes thread access capability for each category of system call as the "access capability bit string."

In some embodiments, the access permission of a thread is stored in correspondence with identification information of the thread (e.g., one or more identifiers, descriptive information, etc.). For example, the terminal stores a mapping of access permissions to threads and/or identifiers of access permissions to identifiers of threads. The identification information of the thread can be thread credential information or other information capable of identifying the thread. The mapping of access permissions to threads (or an access permission allocated to a thread) can be updated. In some embodiments, the mapping of access permissions to threads and/or identifiers of access permissions to identifiers of threads is stored in the secure zone of the operating system (e.g., in the kernel so as to not be exposed to the user space). The mapping of access permissions to threads and/or identifiers of access permissions to identifiers of threads can be configured by an administrator, a manufacturer, an operating system developer, etc. At the initial setting (e.g., as configured or defined by a developer based on thread requirements and/or security status), thread access permission can be stored in correspondence with identification information. During subsequent settings (e.g., as the access permissions are updated to increase or decrease during the running of the thread), thread identification information can serve as a basis to obtain the access permission that is stored in correspondence to the thread or thread identification information. The access permission can then updated, and the updated access permission is stored in correspondence with the identification information associated with the thread. Similarly, the access capability of the thread can be set in a similar implementation of storing access capability in correspondence with thread identification information (e.g., storing a mapping of access capabilities to threads or identifiers of access capabilities to identifiers of threads, etc.). According to various embodiments, an access capability cannot be increased. For example, an access capability can only be decreased. The mapping of access capabilities to threads or identifiers of access capabilities to identifiers of threads, etc. can be stored in the secure zone of the operating system (e.g., in the kernel so as not to be exposed to the user space).

An example of setting an access permission of a thread in a 32-bit Linux system is described below. The access permission of a thread can be set and/or modified in one or more stages of a life cycle of a thread. For example, the access permission of a thread can be set in one or more of the three stages of a thread, a thread creation stage, a thread post-creation pre-run stage, and a thread run stage. The setting of the access permission of the thread in such life cycles stages further detail. In some embodiments, the access capability of the thread can be set and/or modified during the thread creation stage and/or the thread post-creation pre-run stage. Examples of setting access permissions of a thread are further described below. According to various embodiments, the access capability of the thread can be set and/or modified during any stage.

1) When a thread is created, the thread can inherit the access permission of the entity that created the thread (e.g., the creator such as a thread running on the operating system). The creator can call a function to create a new thread.

In some embodiments, in response to a thread being created, the access permission of the entity that created the thread (e.g., the creator of the thread) can be allocated to the thread. For example, a mapping of access permissions to threads can be updated to comprise the access permission of the entity that created the thread mapped to the thread.

The access permission of a creator can be used to set the corresponding access permission of the executor (e.g., the thread created or invoked by the creator) in connection with the executor being created.

As an example, in connection with the Linux system init process starting, the access permission bit string and/or access capability bit string are initialized to 0xffffffff. The access permission bit string and/or the access capability bit string can be stored locally on the terminal (e.g., in a secure zone of the operating system such as a zone that is not exposed to the user space). The initialization of the access permission bit string and/or the access capability bit string can comprise setting all the corresponding bits thereof to a predefined value. For example, the initialization of the access permission bit string and/or the access capability bit string comprises setting the corresponding bits thereof to 1. Thus, if the initialization of the access permission bit string and/or the access capability bit string comprises setting all the corresponding bits to 1, the thread has access permission and/or access capability for all categories of system call. Subsequently, the init process runs specific processes responsible for creating application processes. As an example, the init process can run the seed process. The seed process can correspond to a process that is run to create the application process. After seed process initialization (e.g., in response to the seed process being initialized), the access permission of the seed process and/or access capability of the thread is modified to be lowered. The modified access permission and/or access capability can be stored. For example, access permission of the seed process and/or access capability of the seed process is deleted (or otherwise set to 0 or null) for one or more preset system call categories to obtain minimum permission with respect to the seed process. In some embodiments, the corresponding bits in a seed process access permission bit string and/or seed process access capability bit string are updated to be zeroed (e.g., to denote no permissions or capabilities). In response to updating the access permission bit string and/or seed process access capability bit string, the updated access permission bit string and/or seed process access capability bit string is stored. Updated bit strings are thereupon used to set (and/or define) the access permission and/or access capability of the seed process. The access permission and/or access capability of the seed process can correspond to permissions and/or capabilities that the speed process has to execute (e.g., run) other system calls.

After receiving a request to start program A (e.g., an application installed on the terminal), the seed process completes the creation of the main thread A entity of program A, and the access permission and access capability of thread A are set according to the access permission of the seed. For example, thread A inherits the access authority (e.g., access permission) and/or access capability of the creator of thread A. Thread A can implement the following settings: access permission bit string of thread A being set to be the same as the access permission bit string of the seed, and the access capability bit string of thread A being set to be the same as access permission bit string of the seed. In response to the setting of the access permission of thread A and/or access capability of thread A, thread A has an access permission and/or an access capability that was inherited from the seed process (e.g., the creator of thread A). In some embodiments, upon initialization, the access permission is used to set both the access permission bit string and the access capability bit string for the thread being invoked.

According to various embodiments, the access permission and/or access capability for one or more categories (or each category) of system call is set in accordance with a preset authorization scheme. For example, the access permission and/or access capability of a thread is set to the values specified in the preset authorization scheme. An example of an implementation of setting the access permission and/or access capability for one or more categories of a system call based at least in part on a preset authorization scheme is described below.

2) After a thread is created and before the thread is run, the access permission for the thread is lowered.

The application code that thread A is to run generally is deemed to not be trustworthy. For example, in some embodiments, threads created by the seed are deemed to not be trustworthy. Therefore, to avoid security problems caused by a malicious execution system, after the thread A entity is created and before the thread A is run (e.g., before running the application A code), the access permission for thread A can be lowered. For example, a permission-lowering operation can be executed in response to determining that the thread is created and that the corresponding application code is to be run. The preset-lowering operation can be run to set the access permission of the thread and/or access capability of the thread with respect to one or more system calls to respective predefined settings. For example, the preset-lower operation is run to place system call access permission of thread A and access capability restrictions of thread A within a secure range. The secure range can be configured or defined by an administrator, a manufacturer, an operating system developer, etc. According to various embodiments, the permission-lowering operation comprises: lowering permission of the thread with respect to one or more system calls according to a system configuration file and/or lowering permission according to a corresponding application configuration file. The setting of access permission of the thread and/or access capability of the thread based at least in part on the system configuration file and/or the application configuration file are further described separately below. In some embodiments, the permission-lowering operation comprises similarly lowering the capabilities of the thread with respect to one or more system calls.

a) The access permission of an executor (e.g., the thread) for one or more system calls is modified based at least in part on a status category of the executor and permission configuration information associated with the status category comprised in the system configuration file. For example, the access permission of the executor with respect to each category of system call is modified (e.g., lowered) based at least in part on predefined information pertaining to permissions comprised in the system configuration file. The access permission of an executor (e.g., the thread) for each category of system call is modified (e.g., lowered) based at least in part on a status category of the executor and permission configuration information associated with status category comprised in the system configuration file. The status category of the executor can correspond to predefined rules associated with a thread (e.g., the rule "setcap threadA {open, read}" refers to threadA having the permission of category open and category read).

According to various embodiments, the system configuration file comprises permission configuration information for one or more system calls and/or for one or more (or each) status categories. For example, the system configuration file can be configured to store the permission configuration information for each status category. As an example, the configuration format of the system configuration file or the permission configuration information comprised in the system configuration file comprises a setcap function that sets user (e.g., user application) capability. As an example of a setcap function, "setcap threadA {open, read}" refers to threadA having the permission of category open and category read. The use of the term "user" can correspond to the various status categories, including, for example, an ordinary application, a system application, or a special application. In some embodiments, the applications are characterized or configured to correspond to a specific set based at least in part on configurations by an administrator, a manufacturer, an operating system developer, application developer, etc. For example, an application can be set to be an ordinary application based on a configuration by the developer. As another example, an application can be set to be a special application based on a configuration by the developer. The term "capability" can correspond to the access range (e.g., a permission or capability set) for each category of system call. After the thread A entity is created, one or more preset status conversion rules can be used to generate status category information representing the thread A. In some embodiments, status category information corresponding to a thread indicates the permission/category that can be used to determine whether a category can be accessed. For example, the status category information is generated based at least in part on preset features of application A (e.g., signature information, etc.), application name, routing information, or other information identifying characteristics of the application (e.g., information set by a developer, etc. such as application paths, etc.). In response to generating the status category information, a permission lowering operation can be performed. The permission lowering operation can be performed based at least in part on permission configuration information pertaining to status category in a system configuration file. In some embodiments, the system configuration file stores (or points to) a mapping of permission configuration information to status categories. The permission lowering operation can comprise querying the mapping of permission configuration information to status categories for permission configuration information corresponding to the generated status category information representing the thread for which the permission lowering operation is performed (e.g., thread A in the example above). The permission lowering operation can comprise setting permissions for the corresponding thread based at least in part on the permission configuration information.

For example, after thread A is created, thread A has access permission and access capability for the system call category associated with the uid/gid setting, however, the system configuration file indicates that the determined access permission and/or access capability does not comprise permissions for the category associated with the uid/gid setting. In response to determining that the system configuration file does not comprise permissions for the category associated with the uid/gid setting, the bit corresponding to the category associated with the uid/gid setting in the access permission bit string and the bit corresponding to the category associated with the uid/gid setting in the access capability bit string of thread A are zeroed. In response to the access permission bit string and the access capability bit string being updated, the updated bit strings are used to set (e.g., define) the access permission and access capability of thread A.

b) The access permission of an executor (e.g., the thread) with respect to one or more system calls is modified based at least in part on a permission configuration information comprised in the configuration file of the application to which the executor is associated (e.g., the application that invoked the executor). For example, the access permission of the executor with respect to each category of system call is modified (e.g., lowered) based at least in part on predefined information pertaining to permissions comprised in the configuration file of the application to which the executor belongs. The access permission of the executor for each category of system call can be lowered in accordance with the declared permission information in the configuration file of the application to which the executor is associated (e.g., the application that invoked the executor).

According to various embodiments, program A (e.g., an application installed on the terminal) declares the function permission it needs in the configuration file corresponding to program A. Examples of function permissions needed by program A include: function permission for sending and receiving messages, function permission for accessing a contact directory, etc. Before thread A is run (e.g., but after thread A is instantiated), the system calls for implementing corresponding functions can be selected based at least in part on the function permissions declared by the program (e.g., program A that invoked thread A), and the system call categories corresponding to the selected system calls may be determined. For example, the system call categories relating to the function permissions declared by the program are determined. After the system call categories relating to the function permissions declared by the program are determined, a corresponding permission-lowering operation is executed. For example, in response to determining the system call categories relating to the function permissions declared by a program, the permissions of a thread are modified (e.g., to lower the permission level of the thread). In connection with modifying (e.g., updating) the permissions (e.g., the access permissions and/or access capabilities, etc.) of the thread, the access permission bit string for thread A and the access capability bit string for thread A are updated in a manner such that the bits corresponding to unrelated system call categories are zeroed. Then the updated bit strings (e.g., the access permission bit string for thread A and the access capability bit string for thread A) are used to set thread A access permission and access capability.

According to various embodiments, thread A is a main thread of program A. If thread A separates from the seed (e.g., the permission/capability of thread A is separated from the seed), thread A can create other function subthreads based on function needs. In some embodiments, the thread A is separated from the seed in a manner that modifying the permission/capability of thread A does not affect the permission/capability of the seed. For example, thread A creates a subthread that inherits access permission and access capability of thread A. As another example, before running a subthread, thread A lowers the access permission and access capability of the subthread. As another example, the subthread changes the access permission and/or the access capability of the subthread (e.g., by invoking one or more functions for changing access permissions and/or access capabilities). For example, thread A deletes the access permission and access capability with respect to the system call category associated with creating threads for the subthread (e.g., resulting in the subthread being unable to create another thread). In some embodiments, the corresponding bits (e.g., associated with access permission and access capability with respect to the system call category associated with creating threads) in the access permission bit string of the subthread and the access capability bit string of the subthread are zeroed (or otherwise set to the value indicating that the subthread does not have such permission or capability). The updated bit strings (e.g., the access permission bit string of the subthread and the access capability bit string of the subthread) are thereupon used to set the access permission and access capability of the subthread.

3) Access permission of a thread is automatically adjusted while a thread is running.

According to various embodiments, an access permission and/or access capability of a thread (or a subthread) is adjusted while the thread is running. In the context of the examples described herein, the main thread A of program A and the subthreads created by thread A can be adjusted while running. The access permission and/or access capability of the thread can be adjusted during running by the thread (e.g., the thread can invoke one or more functions corresponding to changing an access permission and/or an access capability). For example, in response to determining that one or more conditions are satisfied (e.g., a context of the thread, the terminal, etc.), the access permission and/or access capability is adjusted while the thread is running. While running, each of the main thread A of program A and the subthreads created by thread A can automatically undergo adjustments to access permission as needed. Automatic adjustment of a thread while the thread is running is further described below using thread A as an example. As an example, if thread B, which is created by thread A, does not need to create a thread (e.g., thread B does not need permissions to create a thread), then thread B can adjust the access permission/access capability of thread B to remove the access permission to create a thread.

After thread A is created, thread A begins running the corresponding application code (e.g., code associated with application A). In the running process, the thread can load and run untrusted code. According to various embodiments, code can correspond to code provided by a third party. For example, a terminal can deem code to be untrusted code in response to determining that information identifying a source of the code (e.g., in the header, other metadata, etc.) indicates that the source of the code is unknown, different from a source of the thread (or associated program that invoked the thread), on a blacklist of sources, not on a whitelist of permitted sources, etc. The terminal can obtain information identifying the source of the code from the code (or information associated with the code), and determine whether the code is trusted (or untrusted) based at least in part on the information identifying the source of the code. In the running process, the thread can call an interface in a library provided by a third party. The interface and/or library provided by the third party can be deemed as untrusted or otherwise posing a malicious threat. The security of such code or library generally has not been effectively verified. Therefore, before loading and/or running untrusted code or library, the access permission and/or access capability of the thread can be adjusted in connection with (e.g., before) loading and running the untrusted code. In some embodiments, before loading and/or running untrusted code or library, thread A can adjust (e.g., lower) the access permission of the thread. The thread can retain access capability in connection with the loading and/or running of the untrusted code. Accordingly, in connection with the loading and/or running of the untrusted code, the thread can adjust the access permission of the thread and not adjust (or not make corresponding adjustments) the access capability of the thread. As an example, the bits corresponding to system call categories prohibited from executing untrusted code in the access permission bit string for the thread are zeroed, and the access capability bit string for the thread remains unmodified (at least as a result of the untrusted code to be loaded and/or run). Then the updated access permission bit string for the thread is used to set the thread A access permission.

After the running of said untrusted code is complete (e.g., in response to determining that the untrusted code has completed running), access permission of the thread can be restored. For example, thread A can restore the access permission of the thread for each category of system call after the running of the untrusted code. The restoring of the access permission of the thread can correspond to modifying the access permission of the thread to an access permission that the thread had before the access permission of the thread was modified in connection with the loading and/or running of untrusted code.

Thread A may restore the access permission of the thread to the access permission the thread had prior to loading the aforesaid untrusted code. As an example, if the access permission was previously lowered, and if the pre-loading access permission of the thread (e.g., the access permission before loading the untrusted code) was not recorded, then, after completing the running of the untrusted code, thread A restores the access permission of the thread with the access capability as the upper limit (e.g., a threshold of permissions up to which the access permissions are to be restored). In some embodiments, the access permission of the thread cannot be updated to exceed the access capability of the thread. For example, in response to restoring the access permissions after the running of untrusted code is determined to be complete, the access permissions are updated to an access permission level that does not exceed the access capability of the thread.

In some embodiments, while a thread is running and before trusted code is loaded and/or run, the access permission of the thread can be modified (e.g. raised). For example, while thread A is running and before thread A loads and runs trusted code, thread A raises the access permission of the thread. In some embodiments, the thread raises the corresponding access permission of the thread invoking a function (e.g., corresponding to changing permissions).

According to various embodiments, a terminal deems code to be trusted code in response to determining that information identifying a source of the code (e.g., in the header, other metadata, etc.) indicates that the source of the code is from a known source, from a known source that is identified as being trusted (e.g., as approved), from a source that is the same as the source of the thread (or associated program that invoked the thread), on a whitelist of sources, not deemed to be untrusted code, etc. The terminal can obtain information identifying the source of the code from the code (or information associated with the code), and determine whether the code is trusted (or untrusted) based at least in part on the information identifying the source of the code.

In some embodiments, an extent to which the access permission of the thread is raised is based at least in part on the trusted code. For example, to ensure that the trusted code implements a function (e.g., a desired function, a function of the trusted code, etc.), the access permission of thread A can be raised based on the function to be implemented. For example, the access permission of thread A is raised based on the needs of the trusted code. In some embodiments, system call categories for which the thread has access permission are added to ensure that the trusted code performs the function to be performed (e.g., a function of the trusted code, a desired function, etc.). However, in connection with raising an access permission of thread A, the process raising the access permission of thread A (e.g., thread A itself) observes access capability of the thread (e.g., the then current access capability of the thread) as an upper limit. The raising of the access permission of the thread is kept within the limits of access capability of the thread. In some embodiments, the access permission of the thread cannot be updated to exceed the access capability of the thread. For example, in response to determining that trusted code is to be loaded and/or run and that a function to be performed in connection with the loading or running of the trusted code requires a level of access permission that exceeds a current access permission of the thread, the access permissions are updated to an access permission level that does not exceed the access capability of the thread.

In some embodiments, the thread is provided with a setcap( ) permission setting interface. The setcap( ) permission setting interface is an interface via which the access permission can be set (e.g., updated). In some embodiments, the thread reduces (e.g., actively reduces) its own permission/capability by calling the setcap( ) permission setting interface; or the thread raises the permission. In some embodiments, the threshold to which the permission for a thread can be raised is the corresponding capability of the thread (e.g., the access capability). For example, an access permission of a thread cannot be raised to be higher than a corresponding access capability of the thread. As an example, the thread can call the setcap( ) permission setting device to update an access permission (e.g., the access permission of the thread). In response to determining that the access permission is to be set (e.g., in response to determining that untrusted code is to be loaded/run, that untrusted code has completed running, that trusted code is to be loaded/run, etc.), the setcap( ) permission setting interface can be called (or the setcap( ) permission setting interface is used to call the setcap( ) function). For example, the access permission information (e.g., access permission bit string) that is to be set is used as an input parameter and the setcap( )interface is called (e.g., with the access permission information). According to the various embodiments, the interface function (e.g., the function called using the setcap( ) permission setting interface) performs the setting function in the kernel. According to various embodiments, the kernel exposes the setcap( ) permission setting interface to processes (e.g., applications, threads, etc.) in the user space of the operating system. In some embodiments, the setcap( ) permission setting interface is used in connection with setting (e.g., modifying) an access capability. For example, in response to determining that the access capability is to be set, the setcap( ) permission setting interface can be called (or the setcap( ) permission setting interface is used to call the setcap( ) function). For example, the access capability information (e.g., access capability bit string) is used as an input parameter, and the setcap( ) function is called (e.g., with the access permission information). According to the various embodiments, the interface function (e.g., the function called using the setcap( ) permission setting interface) performs the setting function in the kernel to set the corresponding access capability.

Please note that the above-presented implementations to setting thread access permission and/or access capability in the various stages may, in a specific implementation, not be used in their entirety. Rather, various portions of the above-described implementations can be selected and combined as appropriate according to need. For example, access permission can be set only when the thread is created (e.g., only in response to determining that the thread is to be created, or during the creation of the thread). As another example, the access permission can be set at creation, and the access permission can be adjusted while the thread is run. Various implementations of setting and/or updating access permissions and/or access capabilities are possible.

In each stage, including thread creation and thread running, the thread access permission of the thread and/or the access capability of the thread can be set at the times and in the manner described above. According to various embodiments, a thread can execute a system call while the thread is running. Process 100 can be implemented in connection with a system call being executed (e.g., by a thread). The system call can be executed based at least in part on an access permission of an executor (e.g., the thread). For example, the system call can be executed based at least in part on the access permission of the executor at the time the system call is being executed (or the request is made to execute the system call). In response to determining that a system call is to be executed (or is being requested), the terminal can determine whether the executor (e.g., the thread) is permitted to execute the system call. The terminal can determine whether the executor is permitted to execute the system call based at least in part on the access permissions of the executor. According to various embodiments, access restrictions are thus imposed on system calls.

In FIG. 1, at 110, a request to execute a system call is obtained. In some embodiments, the system call is communicated (e.g., issued) by an executor. For example, the request to execute the system call can be invoked in connection with a program or process running on the terminal. The program or process running on the terminal can be implemented in a user space of the operating system. In some embodiments, the system call is exposed to the user space based at least in part on set access permissions and/or access capabilities of entities (e.g., programs, threads, etc.) in the user space. According to various embodiments, the kernel obtains the request to execute the system call (e.g., from an executor such as a thread operating in the user space). In some embodiments, the kernel sends the request to execute the system call in response to receiving an indication from the executor that a system call is to be executed (e.g., the execution of the system call is being requested). The kernel can send the request to execute the system call to a process that implements process 100.

According to various embodiments, 110 is performed in connection with a kernel permission check routine. For example, 110 is invoked by a kernel permission check routine (e.g., as the kernel permission check routine is running or as part of the kernel permission check routine).

In connection with the thread executing a system call, the system call will enter the kernel (e.g., the kernel receives the request to execute the system call). In response to the kernel receiving the system call (e.g., the system call entering the kernel), the processing program that implements process 100 receives the request to execute the system call.

According to various embodiments, a request to execute a system call comprises an information pertaining to the system call to be executed. For example, the request to execute a system call comprises an identifier corresponding to the system call (e.g., an index number or name of the system call that is to be executed) and a parameter associated with the execution of the system call. As an example, a parameter associated with the execution of the system call corresponds to a file path "Amp/test file" and an open mode "O_RDONLY" for the system call open.

At 120, a determination is made as to whether an entity to execute the system call has permission for the system call. In some embodiments, in response to receiving the request to execute the system call, the terminal determines whether the entity (e.g., the executor) requesting to execute the system call has the requisite permissions to execute the system call. In some embodiments, determining whether the executor has permission to execute the system call comprises a mapping of access permissions to system calls, or a mapping of permissions of the executor to system calls.

In response to determining that the entity to execute the system call (e.g., the executor requesting to execute the system call) has permission for the system call, process 100 proceeds to 130 at which the entity is permitted to execute the system call. In some embodiments, if the entity is deemed permitted to execute the system call, the request to the system call is forwarded to the corresponding system call function.

In response to determining that the entity to execute the system call (e.g., the executor requesting to execute the system call) does not have permission for the system call, process 100 proceeds to 140 at which the entity is not permitted to execute the system call. In some embodiments, if the entity is deemed not permitted to execute the system call, the system call is ignored and the system call will not be executed.

The determining of whether an entity to execute the system call has permission for the system call is further described in connection with process 200 of FIG. 2.

Figure 2:
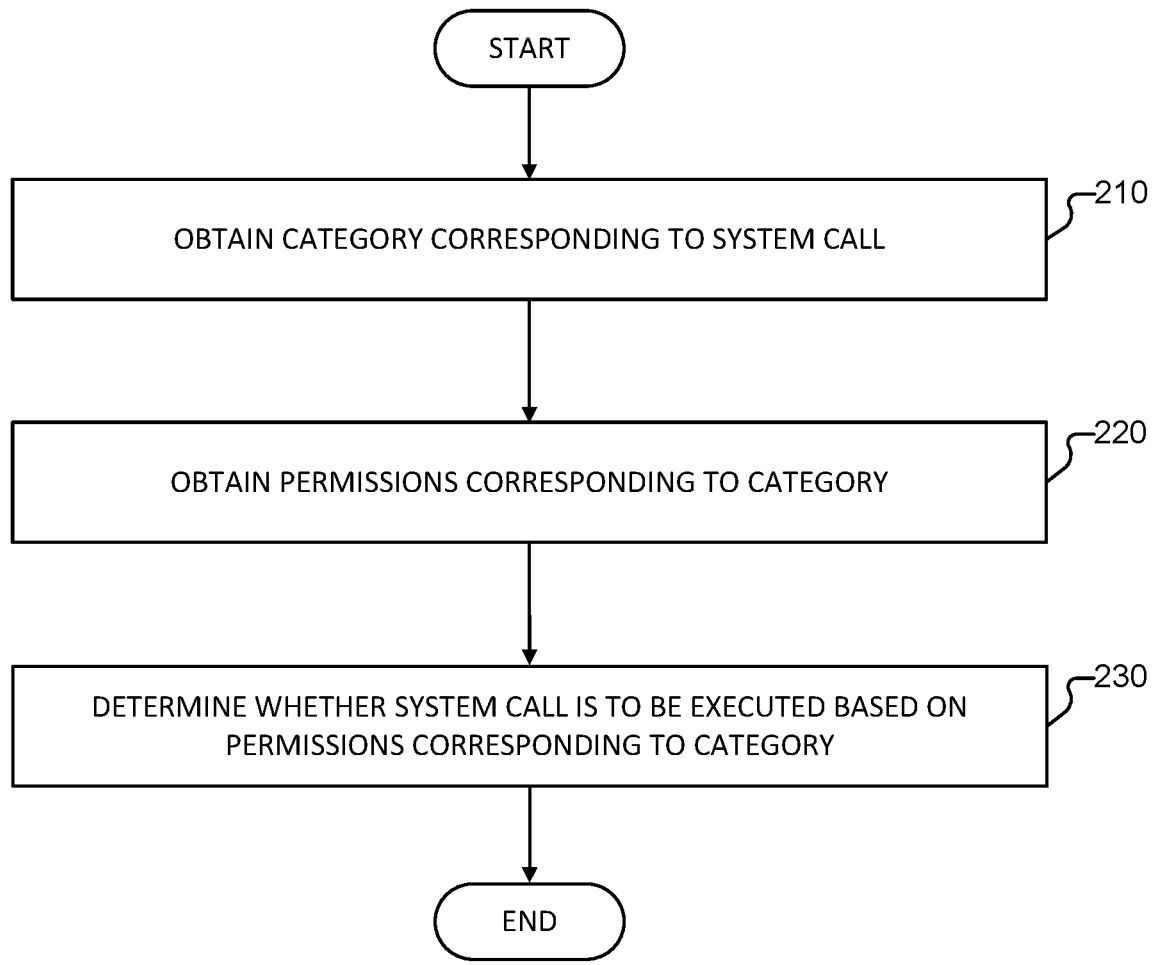
FIG. 2 is a flowchart of a method for determining whether an executor holds access permission for a system call according to various embodiments of the present application.

FIG. 2 is a flowchart of a method for determining whether an executor holds access permission for a system call according to various embodiments of the present application.

Referring to FIG. 2, process 200 for determining whether an executor holds access permission for a system call is provided. Process 200 can be implemented in connection with process 100 of FIG. 1, process 300 of FIG. 3, and/or process 400 of FIG. 4. Process 200 can be implemented at least in part by computer system 500 of FIG. 5.

Process 200 can be performed in connection with 120 of FIG. 1 by a user application thread.

According to various embodiments, process 200 is performed in connection with a kernel permission check routine. For example, process 200 is invoked by a kernel permission check routine (e.g., as the kernel permission check routine is running or as part of the kernel permission check routine).

At 210, a category corresponding to a system call is obtained. In some embodiments, in response to obtaining a request to execute the system call a category corresponding to the system call is obtained. For example, the terminal can obtain the category to which the system call associated with the request to execute the system call belongs. According to various embodiments, the obtaining of the category corresponding to a system call comprises one or more of: determining the system call associated with the request to execute a system call, and querying a mapping of categories to system calls based at least in part on the system call. The determining the system call associated with the request to execute a system call can comprise obtaining an identifier associated with the system call from the request to execute the system call.

According to various embodiments, 210 is performed in connection with a kernel permission check routine. For example, 210 is invoked by a kernel permission check routine (e.g., as the kernel permission check routine is running or as part of the kernel permission check routine).

According to various embodiments, a system call has already been allocated to the system category to which the system call belongs. For example, each system call is allocated to a system category. An identifier associated with the system call (e.g., a name, an index number, another unique value, etc. of the to-be-executed system call) can be used in connection with obtaining the system call category to which the system call belongs (e.g., to obtain the identifier of the system call category to which the system call belongs). As an example, the terminal can determine the system call category to which a system call belongs based at least in part on the identifier associated with the system call.

According to various embodiments, one or more bit strings can be used in connection with determining the system category to which the system call belongs.

For example, system call categories are allocated in advance. In some embodiments, one or more binary bit strings are used to define (e.g., set) the system call categories. A two-dimensional bit array described as category[N][S] can be used for storing and managing system call classifications. The determining the category corresponding to the system call can comprise querying the array category[N][S] using an identifier of the system call (e.g., the index number "scno" of the to-be-executed system call). In response to querying the array category[N][S], the terminal can obtain the category information category[N][scno] associated with the to-be-executed system call. The binary bit string for the system call categories is obtained by combining the N bits, and the resulting binary bit string is abbreviated as "category bit string." In some embodiments, if the request to execute a system call comprises a system call name, then the system name may be converted into an identifier of a system call (e.g., an index number). For example, the terminal can obtain the identifier of the system call based at least in part on performing a look up in a table or the mapping of system call names to identifiers of system calls.

At 220, permissions corresponding to a category are obtained. In some embodiments, the terminal obtains one or more permissions corresponding to a category. The one or more permissions can correspond to an access permission of a category. For example, the access permission of a category can comprise the access permission of the executor for each category of the system call. In some embodiments, the executor is determined based at least in part on the request to execute the system call. The access permissions for the executor with respect to one or more categories can be obtained. In some embodiments, the terminal obtains the access permissions for the executor with respect to the category corresponding to the system call that is associated with the request to execute a system call.

According to various embodiments, the executor is a thread. If the executor is a thread, the access permission can be obtained based at least in part on the identification information of the thread (e.g., an identifier associated with the thread). As an example, identification information for a thread is obtained through the kernel thread context, which is a data structure that includes various information, including the credential information. The access permission (e.g., access permission set) of the thread can be obtained based on the credential information.

According to various embodiments, each thread has corresponding identification information in the kernel (e.g., the identification information corresponding to the thread is not exposed to user space). Via the kernel thread context (e.g., registers, stacks, etc.), the identification information can be obtained. The identification information can comprise credential information. In some embodiments, the credential information is obtained from the identification information. As an example, on the Linux operating system, the identification information is struct task_struct, and the credential information is struct cred, which is a member of task_struct.

According to various embodiments, the obtaining the permissions corresponding to the category comprises obtaining one or more access permission bit strings of the executor (e.g., the thread).

At 230, a determination is made as to whether the system call is to be executed based at least in part on the permissions corresponding to the category. In some embodiments, in response to obtaining permissions corresponding to the category (e.g., to which the system call belongs), the terminal determines whether the system call is to be executed based at least in part on the permissions corresponding to the category (e.g., to which the system call belongs). In response to determining that the system call is to be executed based at least in part on the permissions corresponding to the category to which the system call belongs, 130 of process 100 can be performed. In response to determining that the system call is not to be executed based at least in part on the permissions corresponding to the category to which the system call belongs, 140 of process 100 can be performed.

According to various embodiments, determining whether the system call is to be executed based at least in part on the permissions corresponding to the category comprises determining whether the executor has the requisite access permissions to execute the system call. The determining whether the executor has the requisite access permissions can be based at least in part on the obtained permissions corresponding to the category.

According to various embodiments, 210 comprises obtaining an identifier for the system call category to which the system call belongs, 220 comprises obtaining the access permission set (e.g., identifiers of the categories for which the thread has access permission), and 230 comprises determining whether the access permission set comprises the category identifier obtained at 210. In response to determining that the access permission set comprises the category identifier obtained at 210, the thread can be deemed to have the corresponding access permission (e.g., to execute the system call).

In some embodiments, the access permission of the thread and the system call categories of the thread are described using binary bit strings. If access permission of the thread and the system call categories of the thread are described using binary bit strings, the determining whether the system call is to be executed comprises using a bitwise AND operation. For example, the access permission bit string (e.g., permission) and the category bit string (e.g., category [N][scno]) are subject to a bitwise AND operation (e.g., permission AND category[N][scno]). If, when N=32 (e.g., a single integer bit AND operation is performed), the result is not 0 (e.g., not entirely 0), the thread is deemed to have the corresponding access permission for the category to which the to-be-executed system call belongs. In contrast, if, when N=32 (e.g., a single integer bit AND operation is performed), the result is 0, the thread is deemed to not have the corresponding access permission for the category to which the to-be-executed system call belongs. In response to determining that the executor does not have the corresponding access permission for the category to which the system call to be executed belongs, a response result indicating "call failure," "no call permission," or something similar can be returned to the executor (e.g., the thread). According to various embodiments, a permission check performed using the bit-based bitwise AND operation approach quickly produces an examination result and is thus more efficient.

According to various embodiments, a value of 1 in the access permission bit string corresponds to the thread having access permission for the corresponding category of system call, and a value of 0 corresponds to the thread not having access permission for the corresponding category of system call. In some embodiments, a value of 1 in a category bit string corresponds to the system call belonging to the corresponding category (e.g., the value 1 denotes that the system call belongs to the corresponding category). A value of 0 corresponds to the system call not belonging to the corresponding category (e.g., the value 0 denotes that the system call does not belong to the corresponding category). According to various embodiments, the determining whether an executor has permission to execute a system call associated with the request to execute a system call is performed using a bitwise AND operation. In other implementations, the values of the bits in the access permission bit string and the category bit string can be set in a different way. However, the technical scheme can still be implemented, and higher execution efficiency can still be achieved. According to various embodiments, the value indicating that access permission is held for the corresponding category of system call and the value indicating that the system call belongs to the corresponding category are the same. The use of a same value to indicate access permission and category to which a system belongs enables a bitwise operation to be performed to quickly and efficiently determine whether an executor has permission to execute the system call.

As an example, in a permission bit string, a value of 1 is used to indicate that the executor has access permission for the corresponding category of system call, and a value of 0 is used to indicate that the executor does not have access permission for the corresponding category of system call. Correspondingly, in a category bit string, a value of 1 can be used to indicate that the system call belongs to the corresponding category, and a value of 0 can be used to indicate that the system call does not belong to the corresponding category. The opposite convention of 1 and 0 can be used in some embodiments. The determining whether the executor has permission to execute the system call comprises performing the access permission bit string (permission) and the category bit string (category[N][scno]) to a bitwise OR operation. The executor is deemed to have access permission for the category to which said system call belongs if not all execution results of the bitwise OR operation are 1.

Referring back to process 100, at 130, the executor is permitted to execute the system call.

The permitting the executor to execute the system call comprises deeming the executor to have permission to execute the system call. For example, the thread holds access permission for the system call that is to be executed. Therefore, the thread is permitted to execute said system call. In some embodiments, permitting the executor to execute the system call comprises issuing an access request to a processing program (also called a system call service routine) corresponding to the system call. In some embodiments, permitting the executor to execute the system call comprises triggering (e.g., instructing or invoking) the corresponding system call service routine to implement the corresponding system call function.

At 140, the executor is not permitted to execute the system call.

The not permitting the executor to execute the system call comprises deeming the executor (e.g., thread) to not have access permission for the system call that is to be executed. Accordingly, the executor is not permitted to execute the system call. In some embodiments, not permitting the executor to execute the system call comprises sending a response to the executor (e.g., the thread) indicating that the executor did not have permission to execute the system call. The response is sent to the executor (e.g., the thread) indicating that the executor can be "system call failure," "no call permission," etc.

Various embodiments can be implemented in connection with other functions (e.g., more than just system calls). For example, various embodiments can be implemented in connection with self-defined interface functions (e.g., functions that are required to enter the kernel to be implemented). A system call as specified by the operating system can be referred to as an original system call. In some embodiments, the system call is a standardized interface provided by the kernel to the user mode. The self-defined interface is a feature that can be added (e.g., set or otherwise configured) by the developer to the kernel. In some embodiments, the self-defined interface is not included in the system call. A self-defined interface function can be referred to as a virtual system call. In response to determining that a virtual system call is to be executed, a preset original system call can be invoked after a preset numerical value is used as the portal parameter value. In some embodiments, the portal parameter value is used in connection with modifying the kernel implementation so that the kernel decides to call the additional features added based on these parameters. Using the setcap( ) interface described above as an example of a preset virtual system call, the following setting may be made in advance: if the preset numerical value 100 serves as the value of portal parameter param1, and if an original system call (e.g., syscallA) is invoked, then what corresponds to it is the preset virtual system call setcap( ) (e.g., the kernel implementation has been modified, and thus after the kernel determines that the portal parameter corresponds to 100, the setcap is executed rather than the original syscallA). In such a situation, a permission check on the setcap( ) call can be performed so as to restrict modifications by the thread of permissions of the thread. Such an example is further described in the context of process 100.

In response to receiving a request to execute a system call at 110, the terminal determines whether the system call corresponds to a preset virtual system call based at least in part on information relating to the system call (e.g., information identifying the system call such as an identifier, a name, etc.). In response to determining that the system call associated with the request to execute the system call is a preset virtual system call, the terminal determines whether the executor of the system call has access permission for the virtual system call. In response to determining that the executor of the system call has access permission for the virtual system call, the executor is permitted to execute the virtual system call. In response to determining that the executor of the system call does not have access permission for the virtual system call, the process 100 proceeds in accordance with 120 described above. In some embodiments, the information relating to the system call comprises the system call name and the parameter value. As an example: if the system call name is syscallA, and the parameter value is 100, then the system call associated with the request to execute the system call can be determined to correspond to a preset virtual system call setcap( ).

According to various embodiments, a category to which each system call belongs is set based on pre-allocated system categories. Categories to which virtual system calls belong can be set (e.g., based on pre-allocated system categories). The access permission of the executor (e.g., the thread) can be set for each category of system call.

Using the virtual system call setcap( ) as an example, the system call index number s1 (e.g., which cannot conflict with the index numbers of other system call(s)) can be set as corresponding to the virtual system call setcap( ) and then the category[N][S] table can be expanded to category[N][S1], wherein S1≥s1 and s1=S. The category which the virtual system call setcap( ) belongs can be set using configuration information in the system configuration file (e.g., "syscall.classify type setcap," wherein "type" represents the category identifier (1 through N)). Thus, the binary bit string of length N stored by category[0][s1] through category[N−1][s1] is the category bit string for virtual system call setcap( ).

According to various embodiments, each system call corresponds to an index number, and the maximum index of the system call is set to s1. The virtual system call does not have a corresponding index number, and thus a virtual correspondence is established for such virtual system calls, and the maximum index is set to S1. Because a new virtual system call has been added, then S1>=s1.

When the thread is running, a system call can be executed as necessary in the following way at a unified portal for the kernel: if, according to information relating to the system call that is to be executed, the system call is determined to correspond to the preset virtual system call setcap( ), then, in response to determining that the executor of the system call has access permission for the virtual system call, a bit-based bitwise AND operation approach can be implemented (e.g., the setcap( ) category bit string and the access permission bit string of the executor) are subjected to a bitwise AND operation. If the result of the bitwise AND operation is not zero (e.g., the results are not entirely zero), the executor is deemed to have access permission for the category to which setcap( ) belongs and the setcap( ) can be executed. Otherwise, If the result of the bitwise AND operation is zero (e.g., the results are entirely zero), the executor is deemed to not have access permission for the category to which setcap( )belongs and the setcap( ) cannot be executed.

The implementation supporting virtual system calls can be used in connection with a sandboxing mechanism application. For non-system calls that need to enter the kernel (e.g., performed in the kernel), using the non-system call as a virtual system call can reduce the amount of code development work. As an example, a convention system call mechanism can be used to focus on the implementation of functional characteristics without considering how to switch registers into the kernel state. Moreover, at the kernel portal a determination can be made as to whether the executor has access permission for the virtual system call. Thus, providing an access control mechanism for virtual system calls that is based on the access control provided for system calls is provided. Accordingly, system security can be further safeguarded.

According to various embodiments, determining whether a system call is to be executed is based at least in part on whether the executor has the corresponding access permission. Accordingly, various embodiments restrict system calls through executor authorization and realize executor status-based differentiated control. Various embodiments do not restrict which system calls are unrestricted. Therefore, system call access requirements of user space can be flexibly satisfied.

Figure 3:
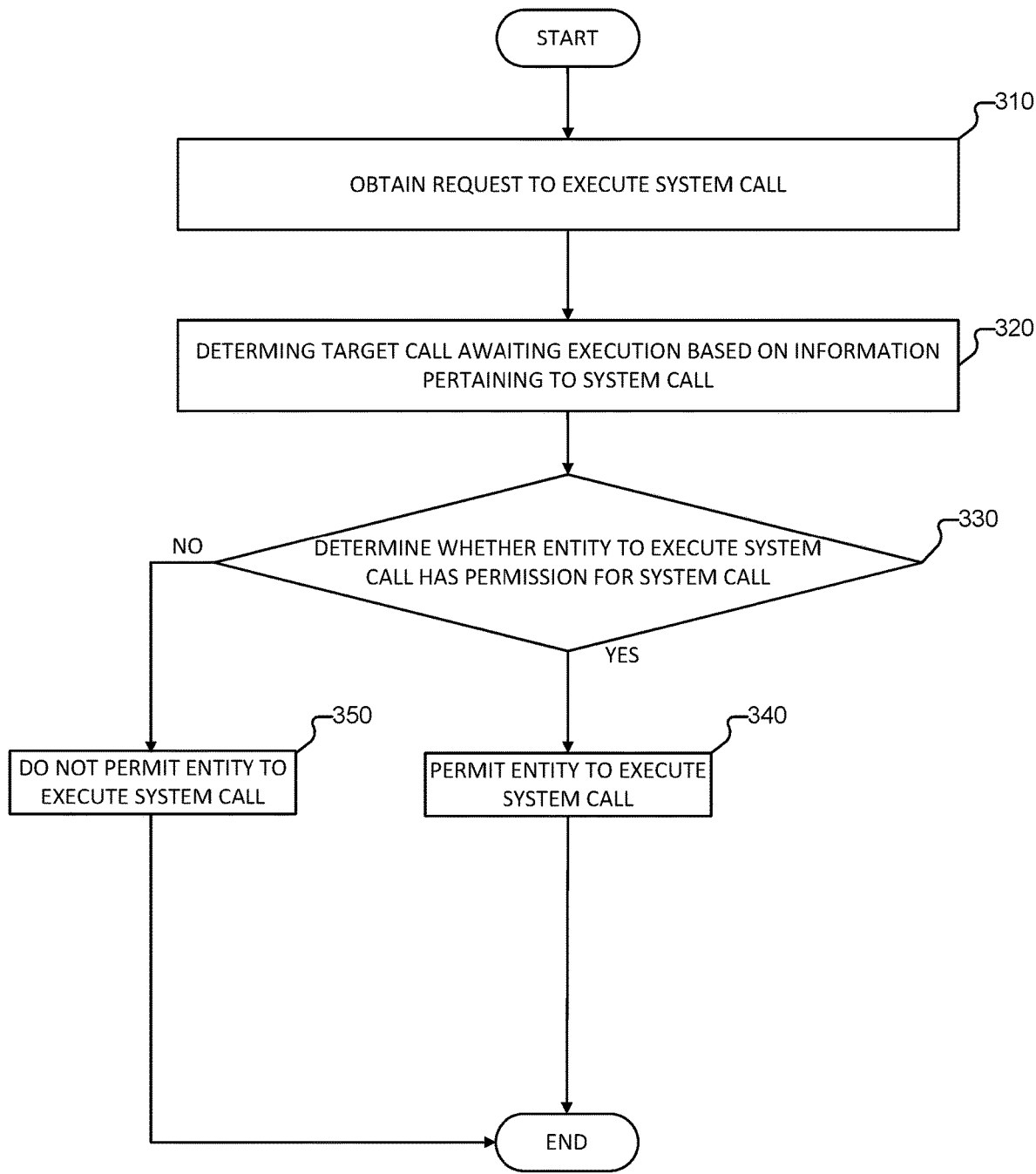
FIG. 3 is a flowchart of a method for executing a system call according to various embodiments of the present application.

FIG. 3 is a flowchart of a method for executing a system call according to various embodiments of the present application.

Referring to FIG. 3, process 300 for executing a system call is provided. Process 300 can be implemented in connection with process 100 of FIG. 1, process 200 of FIG. 2, and/or process 400 of FIG. 4. Process 300 can be implemented at least in part by computer system 500 of FIG. 5. Process 300 can be invoked by a user application thread.

According to various embodiments, process 300 is performed in connection with a kernel permission check routine. For example, process 300 is invoked by a kernel permission check routine (e.g., as the kernel permission check routine is running or as part of the kernel permission check routine).

At 310, a request to execute a system call is obtained. 310 can correspond to 110 of process 100.

According to various embodiments, 310 is performed in connection with a kernel permission check routine. For example, 310 is invoked by a kernel permission check routine (e.g., as the kernel permission check routine is running or as part of the kernel permission check routine).

According to various embodiments, a category (e.g., a category of system calls) to which a preset virtual system call belongs is set. For example, the category to which a preset virtual system call belongs is set based at least in part on pre-allocated system call categories. The access permission of the executor for each category of system call can be set (e.g., in advance of process 300 being implemented).

At 320, a target call waiting execution is determined. According to various embodiments, the target call waiting execution is determined based at least in part on information pertaining to the system call (e.g., the system call associated with the request to execute a system call).

According to various embodiments, the information pertaining to the system call comprises: system call name and parameter value. In some embodiments, the information pertaining to the system call comprises: an identifier associated with a system call and a parameter value. The identifier associated with the system call can be a unique identifier (e.g., unique at least as to system calls defined in the operating system of the terminal).

As an example, the determining the target call awaiting execution is based at least in part on one or more of the system name or parameter value. As another example, the determining the target call awaiting execution is based at least in part on one or more of the identifier associated with the system call or parameter value.

The determining the target call awaiting execution can comprise determining whether the system call corresponds to a preset virtual system call based at least in part on one or more of the system name or parameter value. For example, virtual system calls and system calls use a same entry, and thus, the request is analyzed to determine whether the request corresponds to a virtual system call or a system call.

In some embodiments, in response to determining that the system call corresponds to the preset virtual call, the virtual system call is deemed to be the target call. In response to determining that the system call does not correspond to the preset virtual call, the system call is deemed to be the target call.

At 330, a determination is made as to whether an entity to execute the system call has permission for the target call. In some embodiments, in response to receiving the request to execute the system call, the terminal determines whether the entity (e.g., the executor) requesting to execute the system call has the requisite permissions to execute the target call. In some embodiments, determining whether the executor has permission to execute the system call comprises a mapping of access permissions to target calls, or a mapping of permissions of the executor to target calls.

In response to determining that the entity to execute the system call (e.g., the executor requesting to execute the system call) has permission for the target call, process 300 proceeds to 340 at which the entity is permitted to execute the system call. In some embodiments, if the entity is deemed permitted to execute the system call, the request to the system call is forwarded to the corresponding system call function.

In response to determining that the entity to execute the system call (e.g., the executor requesting to execute the system call) does not have permission for the target call, process 100 proceeds to 350 at which the entity is not permitted to execute the system call. In some embodiments, if the entity is deemed not permitted to execute the system call, the system call is ignored and the system call will not be executed.

Figure 4:
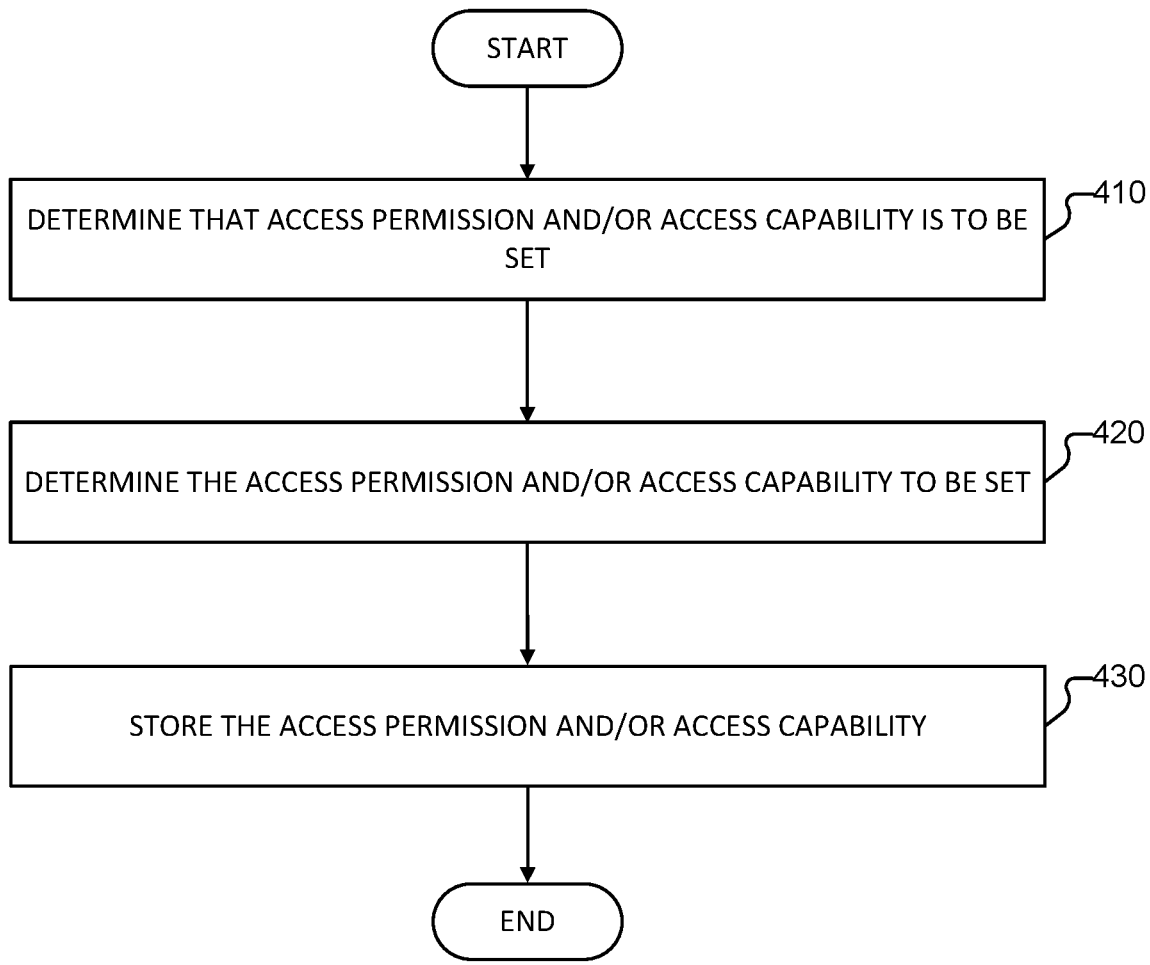
FIG. 4 is a flowchart of a method for setting a permission or capability with respect to a system call according to various embodiments of the present application.

According to various embodiments, every system call and preset virtual system call are pre-allocated to one or more categories. The determining the target call can comprise obtaining the system call category to which the target call belongs. Various embodiments comprise determining an access permission for each category of system call. As an example, the determining whether the entity to execute the system has permission for the system call can comprise determining an access permission for each category of system call. Then access permission for each category of system call can be used in connection with determining whether the executor has access permission for the category to which the system call belongs. FIG. 4 is a flowchart of a method for setting a permission or capability with respect to a system call according to various embodiments of the present application.

Referring to FIG. 4, process 400 for setting a permission or capability with respect to a system call is provided. Process 400 can be implemented in connection with process 100 of FIG. 1, process 200 of FIG. 2, and/or process 300 of FIG. 3. Process 400 can be implemented at least in part by computer system 500 of FIG. 5.

According to various embodiments, process 400 is implemented by a process running on the terminal. For example, process 400 is implemented by a process running in a secure zone of the operating system.

In some embodiments, a kernel of the operating system sets permissions for entities that have permission to perform process 400.

At 410, an access permission and/or access capability is determined to be set (e.g., that a setting of the access permission and/or access capability is to be performed). According to various embodiments, the determining that an access permission and/or access capability is to be set comprises obtaining a request to set an access permission and/or access capability. For example, the setcap( ) permission setting interface can be invoked and a call for the setcap( ) function is obtained. According to various embodiments, the determining that an access permission and/or access capability is to be set comprises determining that untrusted code is to be loaded and/or run. According to various embodiments, the determining that an access permission and/or access capability is to be set comprises determining that an execution of untrusted code is completed. According to various embodiments, the determining that an access permission and/or access capability is to be set comprises determining that trusted code is to be loaded and/or run.

At 420, an access permission and/or access capability to be set is determined. According to various embodiments, the determining of the access permission and/or access capability to be set is based at least in part on a context of the terminal (e.g., a thread running on the terminal). For example, in response to determining that a thread is to run trusted code, the determining of the access permission and/or access capability to be set can comprise determining an access permission and/or access capability required by the trusted code. As another example, in response to determining that a thread is to load and/or run untrusted code, the determining of the access permission and/or access capability to be set can comprise determining an access permission and/or access capability with respect to which the untrusted code is to be restricted. According to various embodiments, the determining of the access permission and/or access capability to be set is based at least in part on information pertaining to the request to set an access permission and/or access capability. For example, the information pertaining to the request to set an access permission and/or access capability can comprise an access permission and/or an access capability comprised in (or identified in) the request to set an access permission and/or access capability.

At 430, an access permission and/or access capability is stored. In some embodiments, the access permission and/or access capability is stored in a secure zone of the operating system. For example, the access permission and/or access capability can be stored in an area of storage of the terminal that is not exposed to the user space.

In some embodiments, the storing of the access permission and/or access capability comprises determining that the executor associated with a request to set the access permission and/or access capability has permissions to set the access permission and/or access capability.

Figure 5:
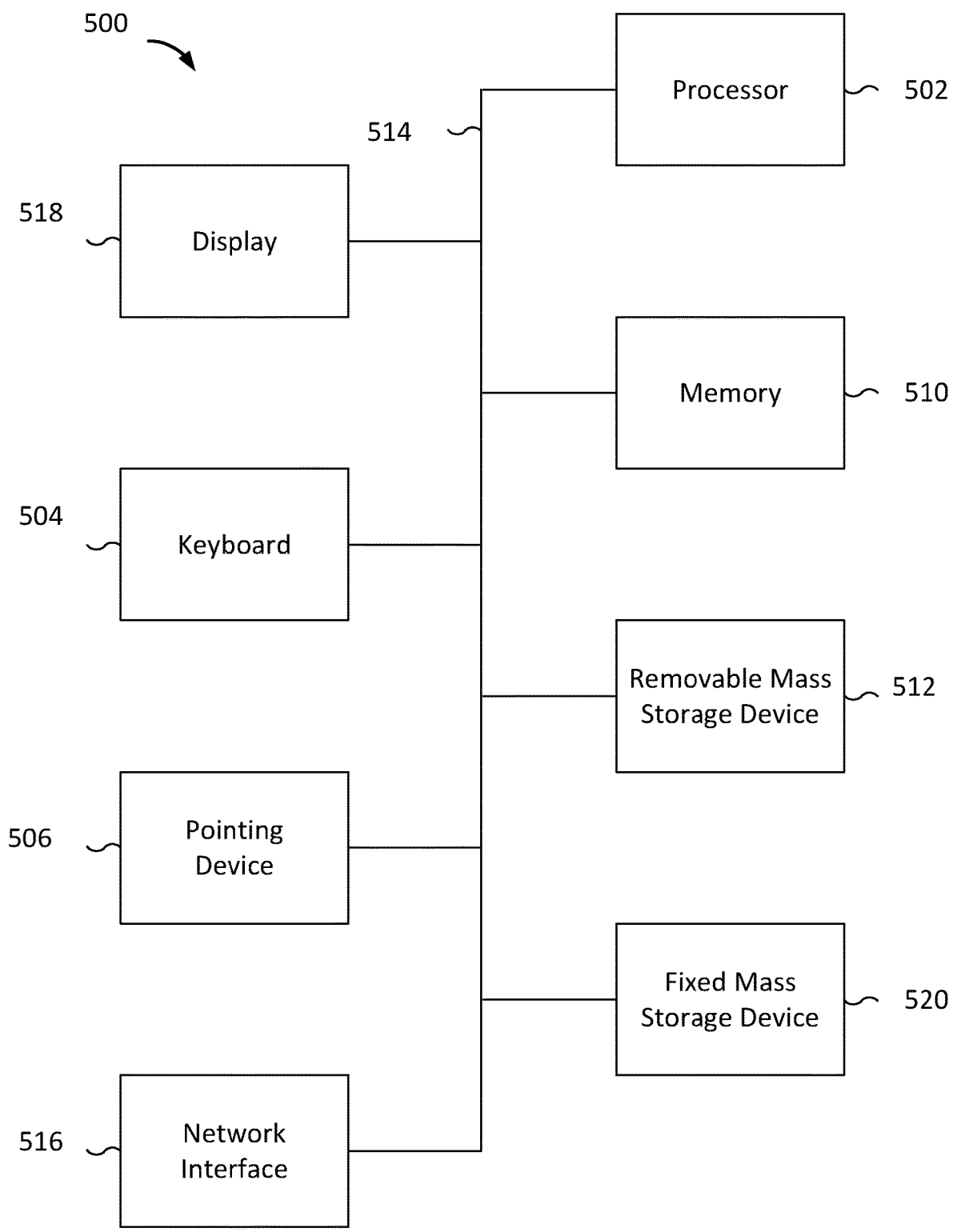
FIG. 5 is a functional diagram of a computer system for executing a system call according to various embodiments of the present application.

FIG. 5 is a functional diagram of a computer system for executing a system call according to various embodiments of the present application.

Referring to FIG. 5, computer system 500 for executing a system call is provided. Computer system 500 can implement at least in part process 100 of FIG. 1, process 200 of FIG. 2 and/or process 300 of FIG. 3, and/or process 400 of FIG. 4.

Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518).

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data, and objects used by the processor 502 to perform its functions (e.g., programmed instructions). For example, memory 510 can include any suitable computer-readable storage media, described below, depending on whether, for example, data access needs to be bi-directional or uni-directional. For example, processor 502 can also directly and very rapidly retrieve and store frequently needed data in a cache memory (not shown). The memory can be a non-transitory computer-readable storage medium.

A removable mass storage device 512 provides additional data storage capacity for the computer system 500, and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storage device 512 and fixed mass storage 520 generally store additional programming instructions, data, and the like that typically are not in active use by the processor 502. It will be appreciated that the information retained within mass storage device 512 and fixed mass storage 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

It should be understood that the devices and methods that are disclosed in the several embodiments provided above can be realized in other ways. For example, the device embodiment described above is merely illustrative. For example, the delineation of units is merely a delineation according to local function. The delineation can take a different form during actual implementation.

Although the present application uses preferred embodiments to disclose the above, they are not used to limit the present application. Any person skilled in the art may make possible changes and modifications without departing from the spirit and scope of the present application. Therefore, the scope of protection of the present application shall be the scope delimited by the claims of the present application.

In a typical configuration, a computer device comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium.

Computer-readable media, including permanent and non-permanent and removable and non-removable media, may achieve information storage by any method or technology. The information may be computer-readable instructions, data structures, program modules, or other data. Examples of computer storage media include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk-read only memory (CD-ROM), digital versatile disk (DVD) or other optical storage, cassette tapes, magnetic tape and disk storage or other magnetic storage devices, or any other non-transmitting media that may be used to store computer-accessible information. In accordance with the definitions in this document, computer-readable media do not include non-transient computer-readable media (transitory media) such as modulated data signals and carrier waves.

A person skilled in the art should understand that embodiments of the present application can be provided as methods, systems, or computer program products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   obtaining, by one or more processors, a request to execute a system call, the request to execute the system call being made by an executor to execute the system call;
   determining, by the one or more processors, whether the executor to execute the system call has an access permission for the system call, comprising:
   obtaining a category to which the system call belongs;
   obtaining, for each category of system call, a corresponding access permission of the executor, wherein the corresponding access permission of the executor for each category of system call and the category to which the system call belongs are respectively indicated in one or more binary bit strings; and
   determining whether the executor has access permission for the category to which the system call belongs based at least in part on the access permission of the executor with respect to the category to which the system call belongs, comprising:
   performing, on a bit-by-bit basis, bit operations on a binary bit string descriptive of the access permission and a binary bit string descriptive of the system call categories; and
   determining that the executor has access permission for the category to which the system call belongs based on results of the bit operations; and
   in response to determining that the executor has the access permission for the system call, permitting, by the one or more processors, the executor to execute the system call.

2. The method of claim 1, wherein the category to which said system call belongs and the access permission of the executor for each category of system call are preset.

3. The method of claim 1, further comprising:
   setting the category to which the system call belongs based at least in part on one or more pre-allocated system call categories; and
   setting the access permission of the executor for each category of system call.

4. The method of claim 1, wherein:
   a length of each of the one or more bit strings is equal to a number of system call categories;
   each bit in the one or more binary bit strings corresponds to one of the system call categories;
   a value of each bit in a binary bit string associated with the access permission indicates whether the executor has access permission for the corresponding category of system call;
   a value of each bit in a binary bit string descriptive of the system call categories indicates whether the system call belongs to the corresponding category; and
   a value indicating that access permission held for the corresponding category of system call is the same as the value indicating that the system call belongs to the corresponding category.

5. The method of claim 4, wherein the determining whether the executor has access permission for the category to which the system call belongs comprises:
   performing, on the bit-by-bit basis, bit operations on the binary bit string descriptive of the access permission and the binary bit string descriptive of the system call categories; and
   determining whether the executor has access permission for the category to which the system call belongs based at least in part on a result of the bit operations.

6. The method of claim 5, wherein:
   a value of 1 in a bit of the binary bit string descriptive of the access permission indicates that the executor has access permission for the corresponding category of system call;
   a value of 0 in a bit of the binary bit string descriptive of the access permission indicates that the executor does not have access permission for the category of system call;
   a value of 1 in a bit of the binary bit string descriptive of the system call categories indicates that the system call belongs to the corresponding category;

a value of 0 in a bit of the binary bit string descriptive of the system call categories indicates that the system call does not belong to the corresponding category;

the bit operations comprise: bitwise AND operations; and the determining whether the executor has access permission for the category to which the system call belongs based on operation results comprises: determining that the executor has access permission for the category to which the system call belongs if not all results of the bitwise AND operations are 0.

7. The method of claim 1, further comprising:

setting the category to which the system call belongs based at least in part on one or more pre-allocated system call categories; and setting the access permission of the executor for each category of system call, wherein the setting the access permission of the executor for each category of system call comprises:

storing the access permission of the executor for each category of system call in correspondence with identification information associated with the executor, wherein the obtaining the access permission of the executor for each category of system call comprises: obtaining the access permission of the executor based at least in part on the identification information of the executor.

8. The method of claim 7, wherein the identification information comprises: credential information of the executor.

9. The method of claim 7, wherein obtaining the identification information: comprises obtaining identification information from execution context information of the executor.

10. The method of claim 1, further comprising:

setting the category to which the system call belongs based at least in part on one or more pre-allocated system call categories; and setting the access permission of the executor for each category of system call, comprising setting access permission of the executor for each category of system call in connection with the executor being created, the setting of the access permission being based at least in part on a preset authorization scheme or on an access permission of a creator of the executor for each category of system call.

11. The method claim 10, wherein the setting access permission of the executor for each category of system call further comprises:

after creating the executor and before running the executor, lowering the access permission of the executor for each category of system call in a preset manner.

12. The method of claim 11, wherein the lowering the access permission of the executor for each category of system call in the preset manner comprises one or more of:

lowering the access permission of the executor for each category of system call based at least in part on a status category of the executor and permission configuration information associated with the status category in a system configuration file; and lowering the access permission of the executor for each category of system call based at least in part on a declared permission information in a configuration file of an application program to which the executor belongs.

13. The method of claim 11, wherein the setting the access permission of the executor for each category of system call further comprises:

raising the access permission of the executor for each category of system call before loading and running trusted code.

14. The method of claim 13, wherein before the executor runs, and in connection with the setting the access permission of the executor for each category of system call, correspondingly setting access capability of the executor for each category of system call;

a set of system call categories for which the executor has access permission being a subset of a set of system call categories for which the executor has access capability; and the raising the access permission of the executor for each category of system call comprises:

raising the access permission of the executor within the access capability of the executor for each category of system call.

15. The method of claim 10, wherein the setting the access permission of the executor for each category of system call further comprises:

lowering the access permission of the executor for each category of system call before loading and running untrusted code.

16. The method of claim 15, wherein the setting the access permission of the executor for each category of system call further comprises:

restoring the access permission of the executor for each category of system call in response to determining that the running of the untrusted code is complete.

17. The method of claim 1, further comprising:

determining whether the system call corresponds to a preset virtual system call based at least in part on information associated with the system call;

in response to determining that the system call corresponds to the preset virtual system call, determining whether the executor of the system call has access permission for the virtual system call, and in response to determining that the executor has access permission for the virtual system call, permitting the executor to execute the virtual system call; and in response to determining that the system call does not correspond to the preset virtual system call, determining whether the executor of the system call has access permission for the system call.

18. The method of claim 17, wherein the information relating to the system call comprises: a system call name and a parameter value.

19. The method of claim 1, wherein the executor comprises: an independently runnable basic unit, the independently runnable basic unit comprising a thread or a process.

20. A device, comprising:

one or more processors configured to:

obtain a request to execute a system call, the request to execute the system call being made by an executor to execute the system call;

determine whether the executor to execute the system call has an access permission for the system call, comprising:

obtaining a category to which the system call belongs;

obtaining, for each category of system call, a corresponding access permission of the executor, wherein the corresponding access permission of the executor for each category of system call and the category to which the system call belongs are respectively indicated in one or more binary bit strings; and determining whether the executor has access permission for the category to which the system call belongs based at least in part on the access permission of the executor with respect to the category to which the system call belongs, comprising:
    performing, on a bit-by-bit basis, bit operations on a binary bit string descriptive of the access permission and a binary bit string descriptive of the system call categories; and
    determining that the executor has access permission for the category to which the system call belongs based on results of the bit operations; and
in response to determining that the executor has the access permission for the system call, permit the executor to execute the system call; and
one or more memories coupled to the one or more processors, configured to provide the one or more processors with instructions.

21. A computer program product, the computer program product being embodied in a non-transitory computer readable storage medium and comprising computer instructions for:
obtaining, by one or more processors, a request to execute a system call, the request to execute the system call being made by an executor to execute the system call;
determining, by the one or more processors, whether the executor to execute the system call has an access permission for the system call, comprising:
    obtaining a category to which the system call belongs;
    obtaining, for each category of system call, a corresponding access permission of the executor, wherein the corresponding access permission of the executor for each category of system call and the category to which the system call belongs are respectively indicated in one or more binary bit strings; and
    determining whether the executor has access permission for the category to which the system call belongs based at least in part on the access permission of the executor with respect to the category to which the system call belongs, comprising:
        performing, on a bit-by-bit basis, bit operations on a binary bit string descriptive of the access permission and a binary bit string descriptive of the system call categories; and
        determining that the executor has access permission for the category to which the system call belongs based on results of the bit operations; and
in response to determining that the executor has the access permission for the system call, permitting, by the one or more processors, the executor to execute the system call.

22. A method, comprising:
setting, by one or more processors, a category to which a system call belongs based at least in part on one or more pre-allocated system call categories; and
setting, by the one or more processors, access permission of an executor for each category of system call, comprising setting access permission of the executor for each category of system call in connection with the executor being created, the setting of the access permission being based at least in part on a preset authorization scheme or on an access permission of a creator of the executor for each category of system call;
obtaining, by the one or more processors, a request to execute the system call, the request to execute the system call being made by the executor to execute the system call;
determining, by the one or more processors, whether the executor to execute the system call has an access permission for the system call, comprising:
    obtaining a category to which the system call belongs;
    obtaining an access permission of the executor for each category of system call;
    determining whether the executor has access permission for the category to which the system call belongs based at least in part on the access permission of the executor with respect to the category to which the system call belongs; and
in response to determining that the executor has the access permission for the system call, permitting, by the one or more processors, the executor to execute the system call.

23. A device, comprising:
one or more processors configured to:
    set a category to which a system call belongs based at least in part on one or more pre-allocated system call categories; and
    set access permission of an executor for each category of system call, comprising setting access permission of the executor for each category of system call in connection with the executor being created, to set the access permission being based at least in part on a preset authorization scheme or on an access permission of a creator of the executor for each category of system call;
    obtain a request to execute the system call, the request to execute the system call being made by the executor to execute the system call;
    determine whether the executor to execute the system call has an access permission for the system call, comprising:
        obtain a category to which the system call belongs;
        obtain an access permission of the executor for each category of system call;
        determine whether the executor has access permission for the category to which the system call belongs based at least in part on the access permission of the executor with respect to the category to which the system call belongs; and
    in response to determining that the executor has the access permission for the system call, permit the executor to execute the system call; and
one or more memories coupled to the one or more processors, configured to provide the one or more processors with instructions.

* * * * *